(12) United States Patent
Kavanagh et al.

(10) Patent No.: US 11,494,788 B1
(45) Date of Patent: Nov. 8, 2022

(54) TRIGGERING SUPPLEMENTAL CHANNEL COMMUNICATIONS BASED ON DATA FROM NON-TRANSACTIONAL COMMUNICATION SESSIONS

(71) Applicant: NAVISTONE, INC., Cincinnati, OH (US)

(72) Inventors: Larry Kavanagh, Cincinnati, OH (US); Jude Hoffner, Glen Ellen, CA (US); Tom White, Newport, KY (US)

(73) Assignee: NaviStone, Inc., Cincinnati, OH (US)

( * ) Notice: Subject to any disclaimer, the term of this patent is extended or adjusted under 35 U.S.C. 154(b) by 479 days.

(21) Appl. No.: 16/673,132

(22) Filed: Nov. 4, 2019

Related U.S. Application Data

(63) Continuation of application No. 15/176,234, filed on Jun. 8, 2016, now Pat. No. 10,523,546.

(60) Provisional application No. 62/172,926, filed on Jun. 9, 2015, provisional application No. 62/175,512, filed on Jun. 8, 2015.

(51) Int. Cl.
*G06Q 30/02* (2012.01)
*G06F 16/335* (2019.01)

(52) U.S. Cl.
CPC ........... *G06Q 30/02* (2013.01); *G06F 16/337* (2019.01)

(58) Field of Classification Search
CPC .............................. G06Q 30/02; G06F 16/337
See application file for complete search history.

(56) References Cited

U.S. PATENT DOCUMENTS

| | | | |
|---|---|---|---|
| 5,848,396 A | 12/1998 | Gerace | |
| 9,280,531 B2 | 3/2016 | Ling, III et al. | |
| 9,286,282 B2 | 3/2016 | Ling, III et al. | |
| 9,589,281 B2 | 3/2017 | Ling, III et al. | |
| 10,523,546 B1* | 12/2019 | Kavanagh | H04L 67/02 |
| 2003/0074397 A1* | 4/2003 | Morin | G06Q 10/107 |
| | | | 705/14.51 |
| 2006/0085255 A1* | 4/2006 | Hastings | G06Q 30/02 |
| | | | 705/14.4 |
| 2014/0207518 A1* | 7/2014 | Kannan | G06F 16/958 |
| | | | 705/7.29 |
| 2015/0278382 A1* | 10/2015 | Kubicki | G06F 16/22 |
| | | | 707/741 |
| 2016/0140627 A1* | 5/2016 | Moreau | G06Q 30/0203 |
| | | | 705/7.32 |

\* cited by examiner

*Primary Examiner* — Scott C Anderson
(74) *Attorney, Agent, or Firm* — Frost Brown Todd LLC

(57) ABSTRACT

As a client device accesses and interacts with a web server of an online retailer, an engagement evaluation server gathers data from both the client device and the web server. Over time, as the client device is used to access the web server and other web servers within the evaluation server network, a profile is built and maintained that describes some aspects of the client device interaction with the web server, including recency of visits, frequency of visits, frequency of views of products, frequency of shopping cart creation and modification, and other factors indicative of the user being engaged with the online retailer. The evaluation server performs statistical analysis and data modeling on profiles in order to generate an engagement score, and then provides the contact information for profiles meeting certain criteria.

18 Claims, 11 Drawing Sheets

TRIGGERING SUPPLEMENTAL CHANNEL COMMUNICATIONS BASED ON DATA FROM NON-TRANSACTIONAL COMMUNICATION SESSIONS

CROSS REFERENCE TO RELATED APPLICATIONS

This is a continuation of, and claims the benefit of, U.S. non-provisional patent application Ser. No. 15/176,234, filed Jun. 8, 2016, which itself is a non-provisional of, and claims the benefit of, U.S. provisional patent application 62/172,512, filed Jun. 8, 2015, and U.S. provisional application 62/172,926, filed Jun. 9, 2015, the disclosures of each of which are hereby incorporated by reference in their entirety.

FIELD

The disclosed technology pertains to a system for identifying, tracking and performing statistical evaluation on non-transactional user interactions with an online resource in order to create an audience of identifiable users and a metric indicating the likelihood that a user will response to a subsequent communication from a party associated with the online resource in the near future.

BACKGROUND

While many challenges are shared by brick and mortar retailers and online retailers, the nature of a website or online service that offers the opportunity to browse and purchase goods or services online provides both additional capabilities as well as additional challenges. Some of the additional capabilities available to an online retailer include the ability to track what areas of an online store are visited, what products and services are viewed, time spent viewing certain areas or products, frequency of visit, referring sites, and even where a potential customer's mouse icon moves and rests on the page. Whether the online presence is a retailer of goods or services, an online directory for a physical venue (e.g. an informational page for a museum, park, or zoo), or even an online home for a non-profit organization or fundraising organization, such a breadth of data may represent a powerful resource. However, despite this additional breadth of data that is available to such online presences, the efforts of online presences to reach an audience are often based upon simplistic choices such as email distributions to every customer who has provided their email address, or email distributions to every customer who has purchased a good or service in the last month. This sort of heavy handed approach to audience communication may not be a problem for email distributions or targeted banner advertisements, but for print communications the cost of creation and mailing may make such broadly targeted efforts a poor choice.

One additional challenge is that the ease with which a potential customer can visit an online presence may lead to a much higher number of visits that have no purchase, service request, donation, or information request associated with them, since the visitor is not heavily invested in the choice to visit the online presence, and has spent little or no time traveling to the online presence via a web browser or other software. For example, in some cases, a potential customer may visit an online retailer and view several products at regular intervals of time, perhaps checking to see if the price has lowered or if additional product information or reviews are available. Since the potential customer is not completing a transaction, and in many cases is not even logging into the sight and identifying themselves, information related to this repeated visitation of the retailer and its products is essentially wasted for purposes of marketing to that potential customer. This wasted data is potentially valuable, since it could be used to provide an indication of a potential customer's engagement with the online retailer and its products, which may provide an indication of the potential customer's receptiveness to marketing efforts.

Some online presences attempt to recapture this data by essentially forcing users to log in to an online storefront or interface, through either obfuscating products, product prices, or other features until a user has a logged in, or by generating a steady stream of reminders, pop ups, and other interface elements that force a user to acknowledge the need to log in. Once the user is forced to identify themselves, the online presence may then attempt to associate some of this wasted data with the user. However, these methods tend to alienate and drive away many visitors, such that even if data is successfully captured and associated with a user it may be of no value since the user may be less likely to respond to a subsequent communication from the online presence in the future as a result of the aggressive approach to identifying the visitor.

Since many online presences have chosen to simply ignore mail advertisement due to the high cost and risk associated with such a marketing campaigns, a powerful tool for growth of an audience is lost. However, if non-transaction data could be seamlessly captured and associated with a visitor, and if that visitor could be identified without harming the user experience, it could allow online presence to target a narrow and receptive audience with print communications. What is needed, therefore, is an improved system for statistical evaluation of non-transactional information in order to determine user engagement with services, products, or purposes of an online presence.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of statistical evaluation of an online shopper's activities. While the disclosed applications of the inventors' technology satisfy a long-felt but unmet need in the art of statistical evaluation of an online shopper's activities, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Figure 1:
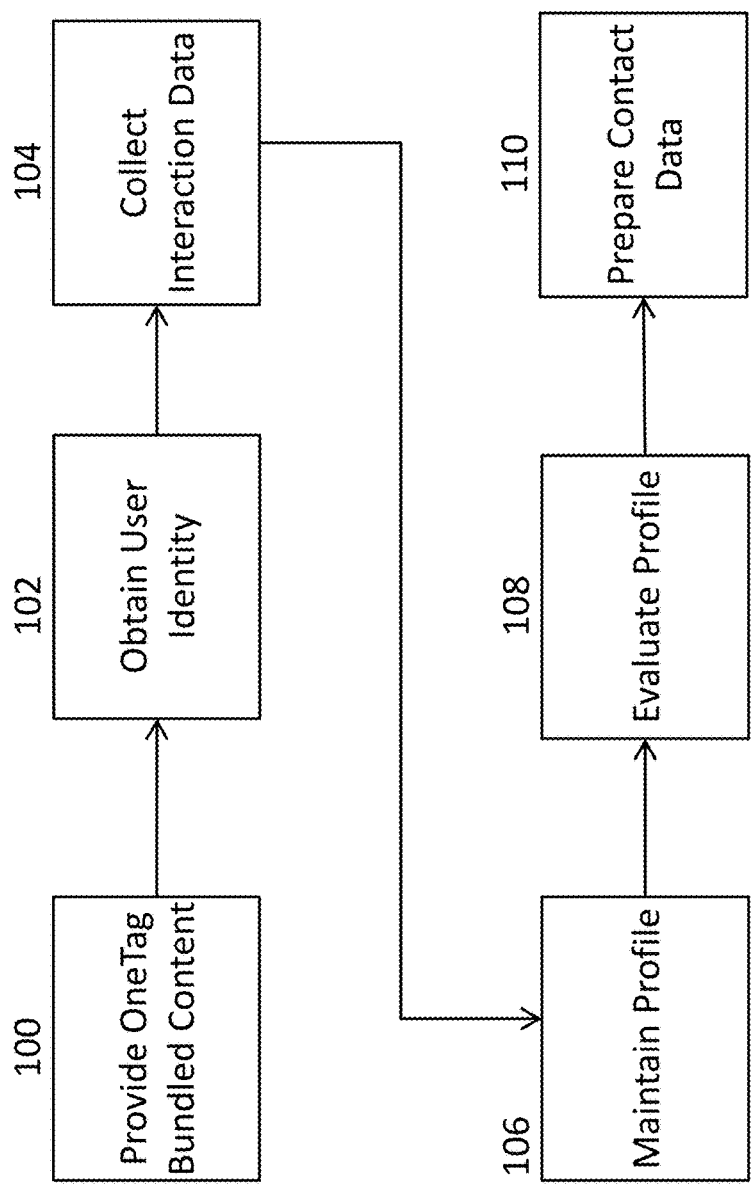
FIG. 1 is a flowchart of a set of high-level steps that a system could perform to evaluate a potential customer based upon a statistical analysis of their activities.
Figure 8:
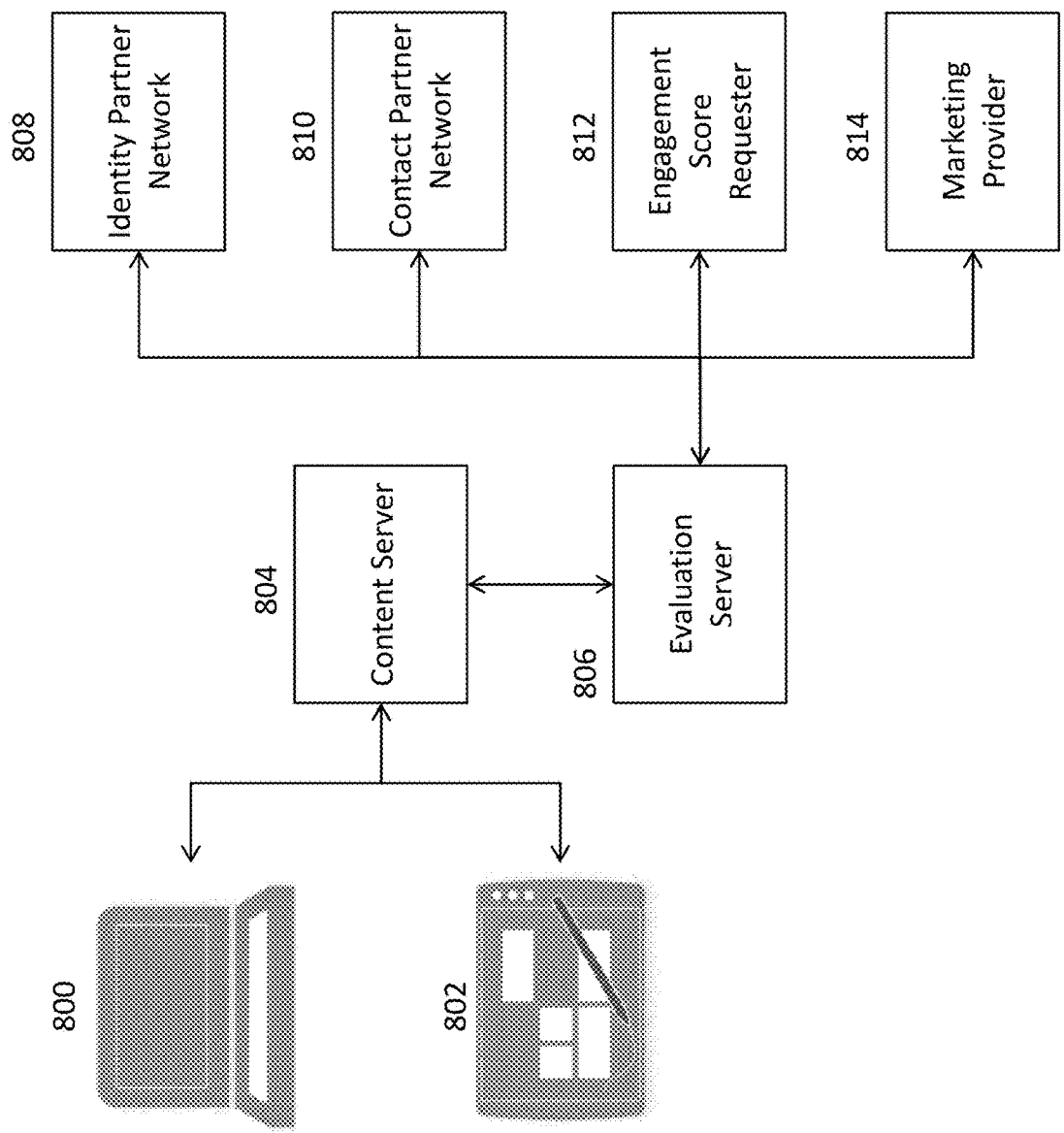
FIG. 8 is a schematic diagram of an exemplary system configured to perform statistical evaluation of potential customer's activities and provide marketing suggestions for likely purchasers.

Turning now to the figures, FIG. 1 shows a flowchart of a set of high-level steps that a system, such as that shown in FIG. 8, could perform to evaluate a potential customer based upon a statistical analysis of their activities. One aspect of the technology disclosed herein is the ability to track a customer's activity across multiples pages of multiple websites or content sources and evaluate that information at a central location such as an evaluation server (806). For example, a customer may use a user device such as a computer (800), handheld device (802), or other device having the capability to access, process, and display information via a network, to access content from a content server (804). Content provided by the content server (804) could include news articles, blog postings, product reviews, images, audio, video, product descriptions, product purchase pages, social media features, and other types of content that are typically hosted on a content server (804) and provided upon request from a user device (800). While an online retailer is one example of an online presence that might be associated with a content server (804), it should be understood that a variety of organizations may have an online presence, and that the technology described herein may apply in whole or in part to any type of online presence.

Typically, a limited set of information about a user or a user device (800) may be available to the content server (804) as part of the request for content. In order to improve the information set that may be available to the evaluation server (806), a OneTag library is configured to be provided from the evaluation server (806) and executed by the user device (800). The content server (804) may be configured to provide (100) a "OneTag" link, tag, or script bundled with content that is provided by the content server (804). When this OneTag bundled content is received by the user (800), the user device may display the content, which may be a web page for example, while executing the OneTag link, which may be a JavaScript code for example.

The OneTag bundled content that is provided to the requester (800) allows the system to obtain (102) a requester's identity by enabling a flow of information from the requester (800) to the content server (804), the evaluation server (806), or both, and which may enable the evaluation server (806) utilize information from a requester (800) to request additional identity information from an identity partner network (808), which allows information collected from the requester (800) to be verified or supplemented with data from the identity partner network (808). When discussing a requester or user identity, it should be understood that while this may refer to a person's identity, such as a name, this could also include a more abstract form of identity, such as a unique customer number, IP address, MAC address, or a combination of semi-unique attributes that allow a person to be identified as a distinct individual without necessarily knowing their name, email address, home address, or other information.

For example, a requester (800) may request content from a content server (804), and receive a set of OneTag bundled content. When this bundled content is processed by the requester's user device (800), information locally stored on the user device (800) in the form of user or browser profiles, settings, configurations, web cookies, or other information may be transmitted to the content server (804), the evaluation server (806), or both. In some situations, this additional information may include an email address, partner network identifier, or other unique or semi-unique identifier that the evaluation server (806) may use to identify the user based upon locally available records, or request additional information on the user's identity from an identity partner network (808). For example, if the evaluation server (806) obtains a partner network identifier from a requester (800), this partner network identifier may be transmitted to one or more identity partner networks (808), which in return may provide additional details such as a confirmation of the requester's identity, information on the user's online activities, contact information for the requester (800), or other information that a particular partner networks may provide (808). As another example, a requester (800) email address may be provided as part of the additional information, which the evaluation server (806) may use to identify the requester (800) based upon a set of known users stored locally on the evaluation server (806). If the user is not identifiable via local records or the identity partner network (808), a new user identity record may be created or started so that future attempts to identify the user based upon local or external records will locate the newly created record.

Once a user identity is obtained (102), whether by matching with local or external records or by creating new identity records for the current session, interaction data may be collected (104) for that identity during the period of time that they spend interacting with the content server (804). This could include collecting data on areas, pages, or products visited, links clicked, time spent, the date and time the session occurred, session frequency over a period of time, or other information. This information may be collected from the user device (800) by the OneTag script that is executed by the user device. The OneTag script may be configured to select information from one or more data storage locations on the user device (800), such as cookies, caches, or data registries, and may also be configured to capture a user's interactions with a browser or other software, such as scrolling, clicking links, hovering over links, and other interactions involving a cursor, mouse, touch location, interface element selection, or the like. In some cases, data may also be collected from the content server (804), which may inherently have access to some information such as IP address, referrer, browser type, and other information as part of a client-server interaction.

As this interaction data is collected (104) it may be associated with the identified user. Interaction data may be used to maintain (106) a profile for the identified user, which could include creating, updating, or modifying records locally available to the evaluation server (806) or updating, modifying, and creating records at an external location such as an identity partner network (808). A profile may include the identity of the user, but may also include additional information such as interaction data that is collected (104) by evaluation server (806) based upon the requester's (800) activities on one or more content servers (804).

When a profile is created or updated as part of profile maintenance (106), the profile may be evaluated (108) by the evaluation server (806). During evaluation (108), data modeling and statistical analysis may be applied to one or more information sets of the profile in order to create an engagement score or response score that represents the requester's (800) level of engagement with goods, services, or content from a particular content server (804) and a resulting likelihood that he or she will respond positively to a communication directed at those goods, services, or content. For example, if a requester (800) visits an online retailer and views several different products, adds some of those products to a shopping cart, and reads product reviews for some of those products, the engagement score generated by statistical analysis of that requester's profile may show a high level of engagement with that online retailer. When the engagement score of a profile falls within a range of scores or exceeds a threshold that indicates marketing efforts for that requester may have a high return on investment, the evaluation server (806) may prepare (110) contact data for that profile, which may include one or more methods of contact associated with that profile, as well as what types of marketing may be appropriate based upon the engagement score and the contact information that is available.

Contact information for a profile may be available on the evaluation server (806), or may be available via a request to a contact partner network (810), which may be the same, or a different network from the identity partner network (808), and which can provide one or more methods of contact based upon a requester identity or other profile information. Once prepared, the contact data may be provided to a party that will undertake a marketing effort (814) with the contact data. In some embodiments this could be third party marketing company who would receive an advertisement and a list of the targeted audience, and would prepare and send the advertisement independently of parties associated with the contact server (804) or evaluation server (806). Such an embodiment may provide an additional benefit of maintaining a level of anonymity, since no employee or agent related to the contact server (804) or evaluation server (806) must view the home address, email address, or other contact information of a prospective customer. In another embodiment, the marketing provider could be an employee or agent associated with the evaluation server (806). In such embodiments, mail marketing and email marketing may occur incrementally as highly engaged potential customers are identified, or may occur in batches upon a request from a party associated with the content server (804).

In yet another embodiment, the contact information may instead be sent to a party such as an employee or agent directly associated with the content server (804), such as an engagement score requester (812), who might then make decisions on and take action on marketing efforts independently. The engagement score requester (812) may be an online retailer associated with the content server (804) that the engagement score is indicative of engagement with. In such an embodiment, an engagement score requester (812) may request one or more sets of contact data for engaged customers during active marketing efforts, or may be configured within the system to automatically receive contact data for requesters (800) whose engagement score exceeds a certain level for certain marketing types. The engagement score requester (812) may then use this contact data to reach out to content requesters via targeting advertisement such as promotional email or print.

Figure 2:
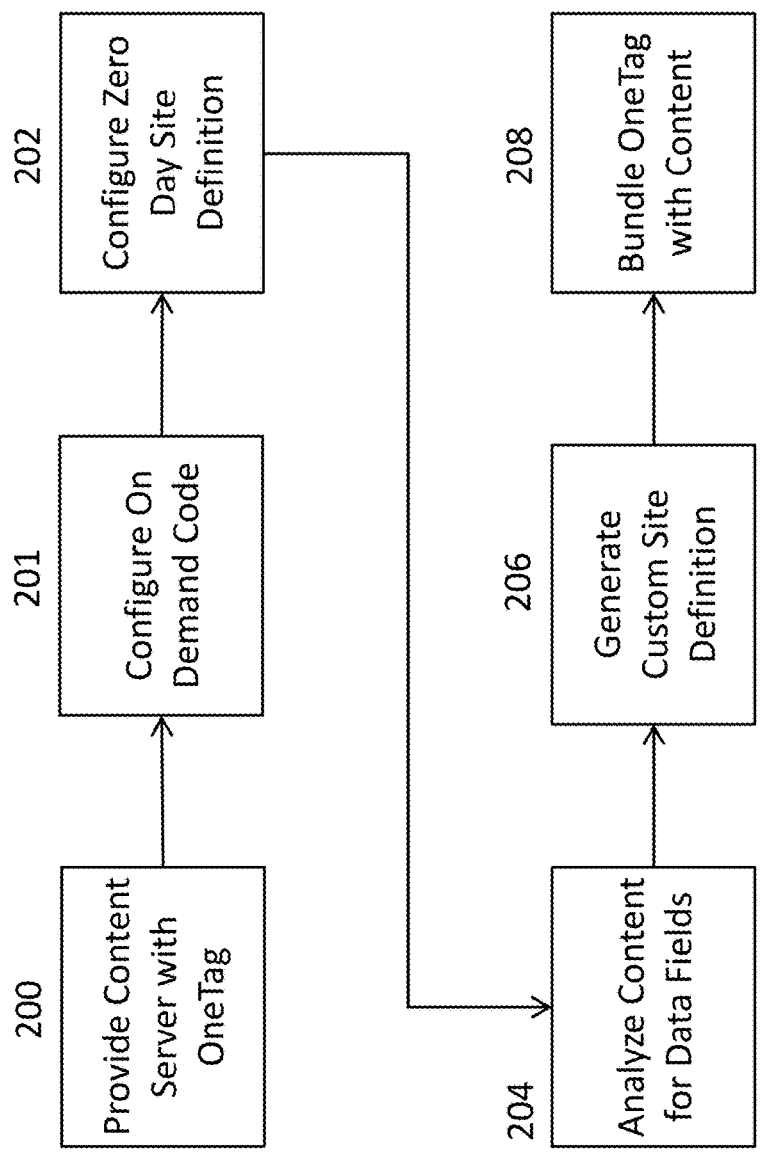
FIG. 2 is a flowchart of a set of steps that a system could perform to configure a client retailer for interaction with the system.

Turning now to FIG. 2, that figure shows a flowchart of a set of steps that a system could perform to configure a client retailer to provide (100) OneTag content to content requesters. Initially, an administrator of the evaluation server (806) may provide (200) the OneTag script or code to an administrator of the content server (804). The OneTag script or code may be a simple line or block of code that may be easily placed within content served by the content server (804). Features of the OneTag script or code should include simplicity, ease of integration, and widespread compatibility. For example, one embodiment of a OneTag script could be a JavaScript invocation that is a single line of code. The single line of code could be placed within a header, footer, or script section of web pages served from the content server (804) without further required setup for administrators of the content server (804). An administrator of the evaluation server (806) may also configure (201) a set of on demand code on the evaluation server (806) or a connected database. The on demand code may contain much of the features and functions of the OneTag software, such as specific functions for searching for and transmitting cookies, caches, and other data on the user device (800) as well as gathering the user's interaction data. When executed, the OneTag script or code may contact the evaluation server (806) and provide a unique identifier that the evaluation server (806) may associate with the content server (804). In response, the evaluation server (806) may provide the on demand code to the user device (800), which can then execute the on demand code to enable the contained features.

The advantages of such an embodiment are that it is minimally intrusive to administrators of the content server (804) since it only requires the addition of a simple code block, and that it allows for the OneTag software to be updated or changed to add new features or fix errors without requiring administrators of the content server (804) to obtain and place modified files. Initial configurations may also include configuring (202) a zero-day site definition on the content server (804). One function that the OneTag software may perform is to use a site definition to map user submitted data fields and other data fields in content served by online retailer's website to data fields that OneTag is familiar with. For example, one website may have a text submission field for name, and a text submission field for email address, as well as a variable contained within the URL or invisibly set within the page describing a product ID or product category ID. The site definition may identify each text submission field, and associate those fields with variables that the OneTag library uses for name and email address, as well as identifying the product ID and category ID fields, so that the OneTag software can reliably select user submitted data and other page data from content and communicate that data via the OneTag software to the evaluation server (806) in a form that is expected.

Configuration (202) of a zero-day site definition may put into place a generic site definition that may work for most content servers (804), but which does not contain any custom configurations unique to a particular content server (804). The zero-day site definition may contain additional tools that may gather data relating to how well the zero-day site definition is functioning, and over time is able to analyze (204) content served by the content server (804) in order to identify which OneTag data fields have been mapped to data fields in content served by the content server (804), and which OneTag data fields are still unmapped. The results of this analysis (204) may be used in conjunction with other tools to generate (206) a custom site definition for content served by the content server (804). Generating (206) the custom site definition may include automated generation, manual generation, or both.

In some embodiments an automated script may be executed that will examine the content served by the content server (804) and the results of the analysis (204) of the zero-day site definition and, using regular expression matching, may identify the form that data fields take in the content served by the content server (804) based upon HTML or JavaScript associated with those data fields, common naming conventions used when naming those data fields, frequency of user submitted data to data fields, types of user submitted data to data fields, validation logic used to verify data submitted to data fields, and other similar methods that may be used to automatically identify data fields. Such an automated script for generating (206) a custom site definition could be executed by a user device (800) that has requested content from the content server (804), an evaluation server (806) which could crawl one or more different pages of content from the content server (804) by following links or using a site map, or could be performed on the content server (804) itself using a server-side scripting language or software program that could scan and analyze content directly on the file system or a database.

For example, software running client-side on the user device (800) may search currently loaded content using a regular expression such as "/sku: [0-9a-z]/", which would search for and identify a data field or element having alphanumeric text following the string "sku:". If such a match was found, a web element identifier for the data field containing the string and identifier would be returned to the evaluation server (806) and used to map the evaluation server's (806) variable for a SKU identifier to the content server's (804) implemented variable for a SKU identifier. In the case of a web page, this data field might be contained within an HTML element such as a <div id="skuholder">, in which case "skuholder" would be mapped to a database field of the evaluation server (806) for SKU. Since SKU is a common identifier, such a site definition mapping could be included in a zero-day site definition, and once the evaluation server (806) successfully maps the content server's (804) SKU variable to its own SKU variable, could also be included as a site definition mapping in a custom site definition. As previously discussed, the same or similar software could also be executed by the evaluation server (806) which, instead of analyzing content one section or page at a time, could crawl the entirety of the content available on a content server (804) indexing and analyzing each page or section, or could be executed on the content server (804) itself using a server-side software such as PHP or PERL to search a file system or database associated with the content server (804).

Other patterns that a regular expression could use to identify and associate a variable used by content server (804) to a variable used by evaluation server (806) exist. For example, an administrator of a content server might indicate that all variables submitted by users might following a naming convention such that the variable names and elements associated with that variable have a prefix "user_", resulting in variables and elements named "user_phone", "user_email", "user_zip" and so on. A zero-day site definition could be modified to identify variables and elements having that prefix, and once identified, map those variables to the evaluation server's (806) own variables.

Other automated ways that a client-side script could identify data fields might include searching for particular interface elements such as an <input> tag or <select> tag, as these would indicate that a user is submitting some type of information that may need to be mapped to an evaluation server's (806) version of the information. Once identified, the names and validation used on these elements may indicate what information is being submitted, such as a <input id="user_address"> element likely receiving a user address, or a <input> element that is associated with JavaScript that ensures only numbers are entered in the form ###-###-#### likely receiving phone numbers. As fields are identified and mapped, the evaluation server (806) will begin to populate data for those fields. Data validation rules enforced by the evaluation server (806) or its database may identify fields that are erroneously mapped, such as where alphabetical text might be placed in a field for storing phone numbers. In this case, the mapping could be removed and allowed to re-map to a different content server (804) variable while excluding the previous erroneous mapping or a data analyst could manually review the content and identify the appropriate variable for mapping. Over days or weeks, the evaluation server (806) will map a number of data fields, and eventually a data analyst may examine the results of the mapping and analysis (204) and manually identify and map the remaining missing data fields in order to generate (206) a custom site definition. Thus, the evaluation server (806) may accomplish the task of mapping data fields and generating (206) the custom site definition in a completely automated manual using the methods described above, or in a partially automated manner with some manual oversight.

With either a zero-day site definition in place, or with a custom site definition, the content server (804) may additionally be configured to bundle (208) the OneTag script or code with content that is served from the content server (804). This may include a JavaScript tag, an HTML element, or another piece of software that may be bundled (208) with requested content and, when received by the requester, executed to perform one or more tasks on the requester's user device (800), such as searching for and retrieving data from cookies or caches, mapping data fields between the content (804) and evaluation (806) servers, and collecting information on the user device's (800) interactions with the content server (804). Tasks performed by the bundled (208) OneTag script or code could also include retrieving information from the user device (800) such as local settings or configurations, local web browser or cookie objects, and other information. Tasks could also include sending one or more pieces of information back to the content server (804), or the evaluation server (806), or both.

Figure 3:
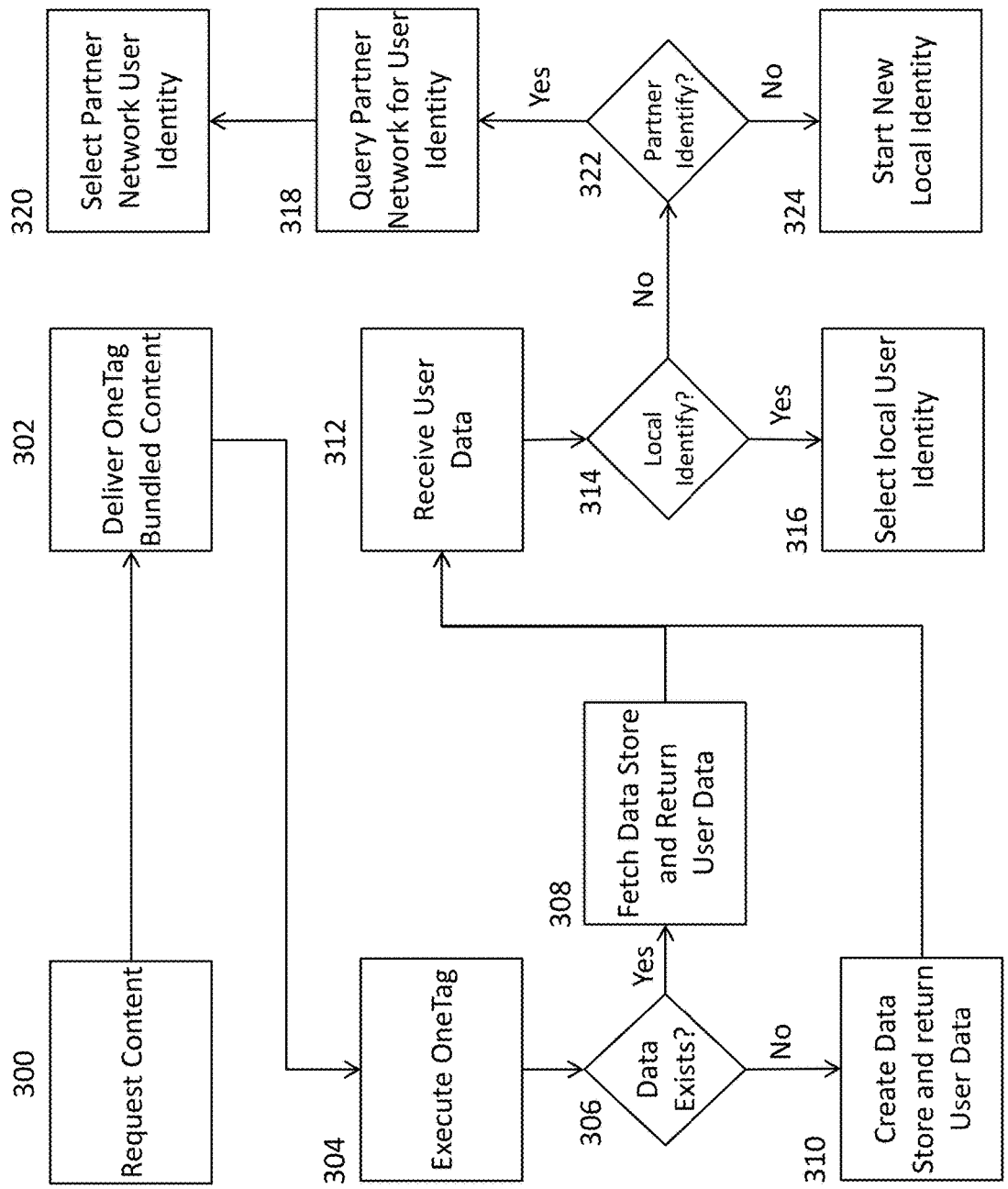
FIG. 3 is a flowchart of a set of steps that a system could perform to identify a customer.

Turning now to FIG. 3, that figure shows a flowchart of a set of steps that a system could perform to identify a customer. When a content server (804) is configured to provide (100) OneTag software along with content, the evaluation server (806) is able to directly or indirectly receive additional information from a content requester (800) that executes the OneTag software. This additional information could include session information gathered from a current or recent content request, but could also include historic information stored locally on the user device (800) in the form of a cache, cookie, configuration, or other data store. As shown in FIG. 3, this additional information can be used to gather even more information about a requester, as well as to identify the requester as a distinct individual. The pictured process begins when a requester, via a user device (800), requests (300) content from a content server (804). This request could be through a software application or web browser running on the user device (800), and the requested content could be any type of content that may be viewed via a web browser or software application, including text, images, audio, video, games or other interactive features, social media, or the like. The content server (804), upon receiving the requested (300) content, may deliver (302) content bundled with the OneTag software tag or code to the user device (800). As described previously, this bundled tag or code could be JavaScript, an HTML element, a Flash element, or another piece of software that may be transmitted to and interpreted or executed by a client as part of a network request.

When received by the requester, the OneTag bundled content may both cause content to display on the user device (800) as well as execute (304) the OneTag client-side software as a background process. When executed, the OneTag script or code may request the full OneTag software from the evaluation server (806), since in some embodiments the only OneTag software which would be provided by the content server (804) would be a single line of code. The evaluation server (806) may examine this request and identify the content server (804) from which the OneTag script or code originated so that customized portions of the OneTag software, such as the site definition, may be selected from a database and provided to the user device (800) so that it can be stored and made temporarily available to the user device (800) until that browser session ends or the cache is cleared.

After the full OneTag software is available on the user device (800), the software may be executed to cause the user device (800) to check (306) to see if certain information exists on the user device (800). This could include checking browser session information, checking a software application cache, checking browser and software configurations, checking parameters contained within the URL, or checking for browser cookies that may have previously been sent to or created on the user device (800). In the case of browser cookies or other semi-permanent client-side data stores, if such a data store exists (306), the client-side OneTag software may fetch (308) the information from the session and data store and send it to the evaluation server (806). Where the data store such as described above does not exist (306), the client-side OneTag software may create (310) a data store, such as a cookie, cache, or other client-side data store and populate it with information from the session and associate a unique identifier with it. Whether a data store already exists or was newly created, the available user data, which may be a combination of current session information as well information from a data store, may be sent from the user device (800) to the evaluation server (806).

As an example of how the above steps may occur in practice, a user may access an online retailer site at a URL via their web browser (300) causing a request for content to be sent to the content server (804). The content server (804) receives the request, and provides a response that includes both the content associated with the requested URL, as well as a OneTag client-side script in the form of a single line or block of JavaScript code. The user device (800) receives the content and displays the viewable portion, while executing the OneTag client-side script as a background process. When executed, the OneTag client-side script may request the full OneTag software from the evaluation server (806), which will provide one or more additional JavaScript codes to the user device (800), which then executes the additional OneTag Software. The additional OneTag software may then search for data that has been cached on the user device for pre-existing cookies or data stores. If the user device (800) has been previously used to request content from the content server (804), or another server running the OneTag software library or a similar library, such a data store may exist. For example, if the user device (800) has frequently been used to access content at the content server (804), a cookie may exist on the user device (800) containing information on one or more previous sessions, including products that were shopped for, pages that were visited, and user information that was submitted such as email, phone number, or other information. This cookie may be accessed (308) by the OneTag client-side software and sent to be received (312) by the evaluation server (806). If the OneTag client-side software cannot locate a cookie, such as where the user device (800) has not previously accessed the content server (804), or where it has recently cleared its online cache, a cookie may be created on the user device (800) and may initially contain session information from the current session, such as pages visited, length of visit, and other information, as well as a unique identifier provided by the OneTag client-side software.

After the evaluation server (806) receives (312) the user data from the user device (800), the evaluation server (806) may determine (314) whether the user can be identified based upon locally available data. For example, if the user data contains information from a cookie that contains a unique identifier placed there by a OneTag client-side process originating from the content server (804) or another server running the OneTag library, the unique identifier may be used to find locally stored records that are also associated with that unique identifier. Similarly, a name, email address, phone number, or a combination of such information might be used to search locally available records associated with a particular user. If such information is available, the evaluation server (804) may select (316) the locally available identity to be associated with information received from the user device (800) during the present session. If the user cannot be identified (314) based upon locally available information, the evaluation server (804) may query (318) a partner network (818) and provide portions of the user data or a partner ID that may be used to search for a user identity in the partner networks records. This may be the case where, for example, a user has not interacted with content servers (804) supporting the OneTag library, but has interacted with other servers that have placed unique identifiers or other identifying information in data stores on the user device (800). Where an identity is available via a partner network (808), the partner network identity may be selected (320) to be associated with the user, and may in some cases be copied to the evaluation server (806) so that it is locally available in the future. Where neither a local identity exists (314) nor a partner identity exists (322), the evaluation server (804) may simply start a new identity within local records, as the user has either had no contact with the OneTag network or the partner network or has recently removed any evidence of such a contact.

Figure 4:
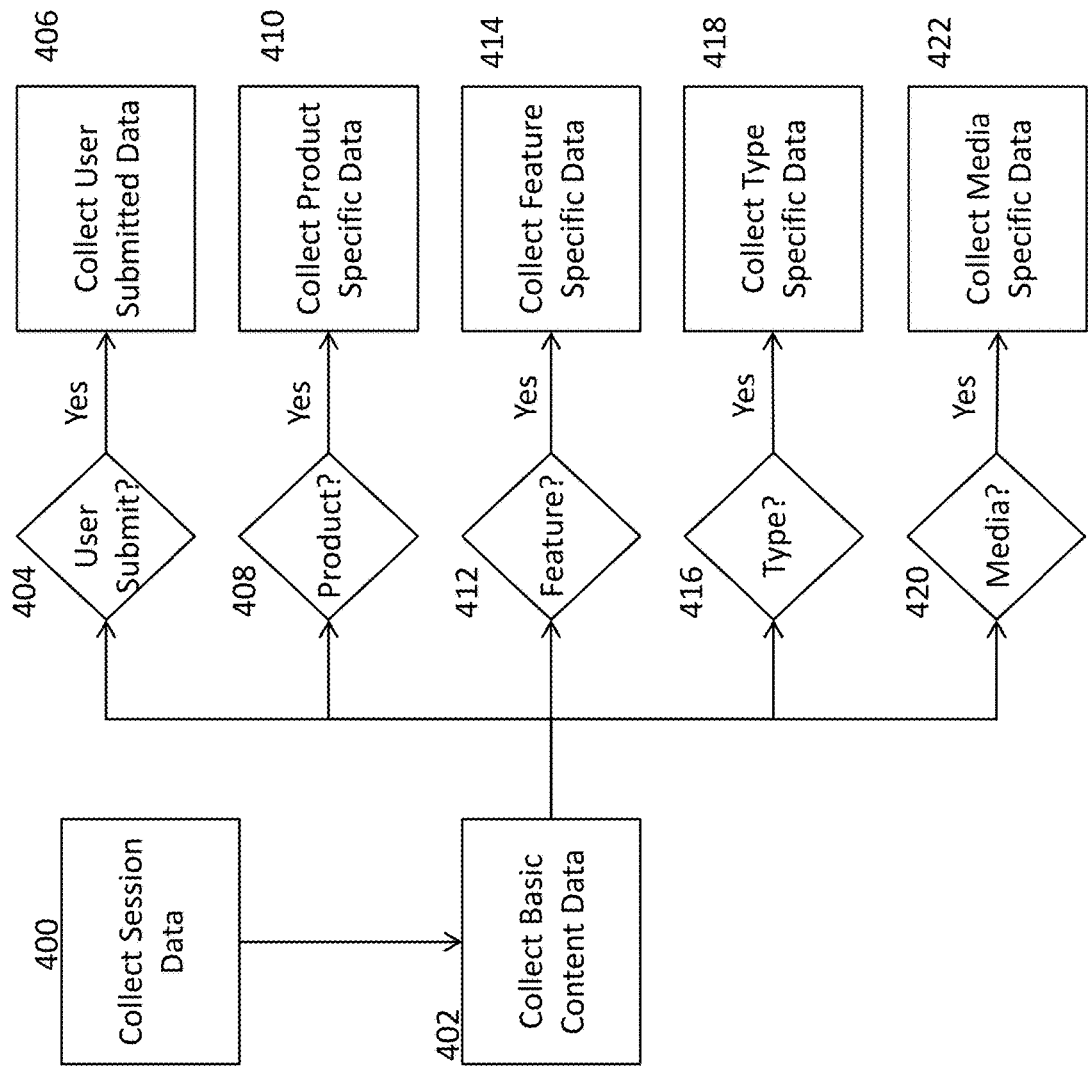
FIG. 4 is a flowchart of a set of steps that a system could perform to gather customer data.

Turning now to FIG. 4, that figure shows a flowchart of a set of steps that a system could perform to gather customer data. With a user either identified or newly created (102), the evaluation server (806) may begin to gather data on the user or potential customer. With information being provided from the user device (800), via the OneTag client-side component, the evaluation server (806) is able to receive a rich flow of information describing various aspects of the user's interactions with the content of the content server (804). Initially, this may include collecting (400) session data for that particular instance of contact, which may include somewhat static information that is set when the session begins, for example, session start time, browser or software used to request content, referring site or link, geolocation of request, IP address, and other similar information. Basic content data may also be collected (402), which might include information that is not specific to the session and is instead specific to the currently loaded content and which all types of content are likely to have, this could include a URL, number of times the URL has been visited, last time the URL was visited, site map category, whether any errors occurred when loading the page, whether any features of the page were blocked or refused by the requester's browser, or other basic content data.

After collecting (400, 402) basic session and content data, the evaluation server (806) may begin to collect data that is specific to the particular type of content requested, as well as data indicative of a user's interactions with content. For example, when a user submits (404) data via a submission field of any type, whether it be information about the user such as name, email, address, phone number, or other information, or whether it be a text search, a list filter, a product category, or a navigation to another page or section of the site, this information may be collected (406) and associated with the user identity.

As an additional example, when a user interacts with a product or service in a variety of ways (408), such information may be collected (410) and associated with the user identity. This could include viewing a product page, viewing product reviews for a product, adding a product to a cart, choosing to view additional information about a product, comparing two different products, time spent on a product page, frequency of visit to a product page, viewing images of a product, viewing videos of a product, and other similar interactions that a user may make with a product.

As an additional example, when a user interacts with a page feature (412), information generated from this interaction may be collected (414) and associated with the user identity. This could include playing a game available on the page, enabling social media features for a page, interacting with social media buttons on a page, entering a live chat session or live support session on the page, and other similar features that a user may interact with.

As an additional example, when a user interacts with content of a certain type that may be indicative of engagement with an online retailer (416), information generated from this interaction may be collected (418) and associated with the user identity. This could include articles, news updates, blog postings, an "about us" page, a contact page, a company history page, a staff listing page, or other similar types of content that may be indicate of engagement with a retailer or brand.

As an additional example, when a user interacts with media such as images, audio, or video (420), information generated from this interaction may be collected (422) and associated with the user identity. This could include viewing of thumbnails, viewing of maximized images, activating an audio feature, time spent with audio feature active, activating a video feature, time spent with video feature active, and other information relating to media available on an online retailers site. Other types of information that may be collected from either a user device (800) via the OneTag client-side features or the content server (804) via the OneTag server-side features will be apparent to one of ordinary skill in the art in light of the disclosure herein. All such information collected may be associated with the current user identity.

Figure 5:
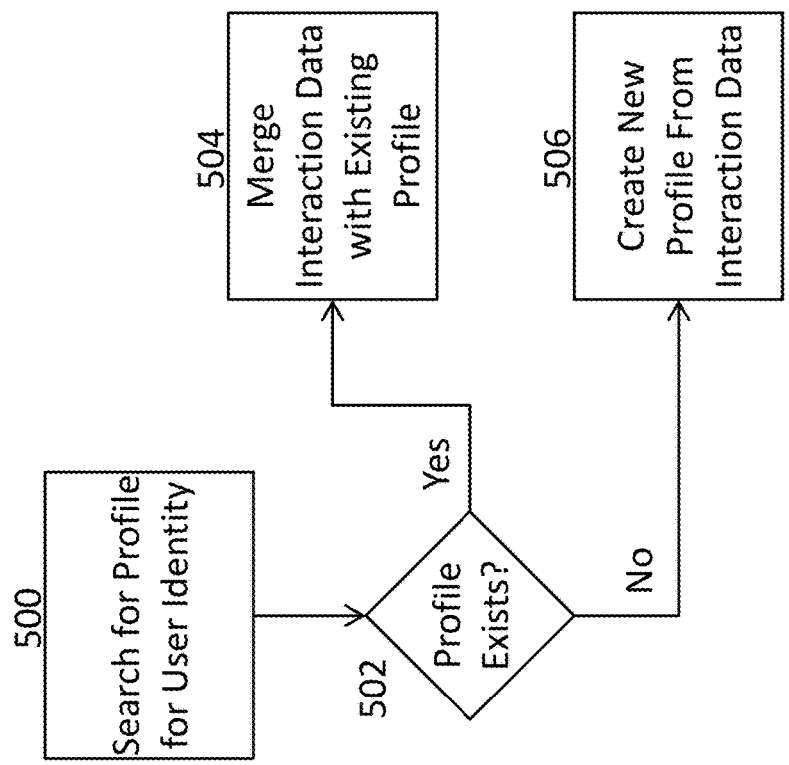
FIG. 5 is a flowchart of a set of steps that a system could perform to manage a customer profile.

Turning now to FIG. 5, that figure shows a flowchart of a set of steps that a system could perform to manage and maintain (106) a customer profile based upon interaction data and a user identity. When a set of interaction data is available for a user identity, the evaluation server (806) may search (500) for a user profile associated with that user identity. While a user identity and a profile may share some common data they may be different data sets with different purposes. One distinction is that a user identity describes a distinct user or shopper in the world of online retail, while a profile may contain some identifying information but also is a collection of descriptions of one or more interactions of a user identity with online retailers. For example, a database of the evaluation server (806) may contain a user identity table that contains a unique user identifier such as an identification number, email address, phone number, or other information that singularly or in combination might provide a unique identifier. The user identity table may be linked to a number of other tables by a primary key or other field, with the other tables containing data describing all collected interactions and sessions associated with the user identity. The user identity may also be linked to a profile table, and the profile table may contain or reference subsets of data from both the user identity table and the other tables, so that when viewed in isolation a single profile record or result might both identify a user with a subset of data from the user identity table as well as identify one or more interactions or sessions of the user with a subset of the other tables. So, rather than describing every single available detail on a user, a profile for a user identity may instead described only the details that are most relevant for determining a user's level of engagement at the time it is queried or viewed.

Searching (500) for a profile for a user identity may be accomplished by, for example, searching a database of the evaluation server (806) for a profile record linked to a unique identifier of the user identity. If such a profile exists (502), the collected interactions for the user identity from the current session may be merged (504) with the existing profile. This could include updating contact information, user information, or other information, totaling the number of visits the user has made to the retailer based upon past and present interaction data, determining the period of time between the current visit and the most recent prior visit, totaling the number of visits over several periods of time, totaling the number of visits by referrer or source of visit (e.g. banner click, search engine, social media), totaling he number of visits by device, totaling the number of carts that have been created during visits, totaling the number of products or services added to carts during visits, total number of visits to one or more specific pages, products, or areas, and other relevant information that may be aggregated and viewed based upon past and current interaction data that has been collected. Where no profile exists (502) for a user, the system may instead create (506) a new profile from the present interaction data, which could include populating one or more of the above fields based upon the currently available interaction data.

For example, where a profile already exists (502), the profile record may be updated (504) to supplement the current email address associated with the profile with a new email address provided during the most recent visit, and may also be updated to reflect that this is the user identity's $15^{th}$ visit to the site, and the first visit in 2 months, that the visit originated from a banner advertisement and that this is the first visit originating from a banner advertisement for the user identity, and that the user has visited three different product pages on the retailer site four, five, and six times respectively. As an alternative example where a profile does not exist (502), the profile record may instead be created (506) with information identifying the user identity's browser and device for the current visit, adding an IP address for the user, leaving email blank, perhaps because the user did not submit an email address to a data submission field during the visit to the retailer, and with product visits, category visits, and other counter based fields incremented to reflect interactions during the current visit. Based upon these examples, it may become clear that a brand new profile contains a relatively small amount of information as compared to a profile that has been maintained and updated over the course of months or years, however, even relatively young profiles may provide a valuable collection of information.

Figure 6:
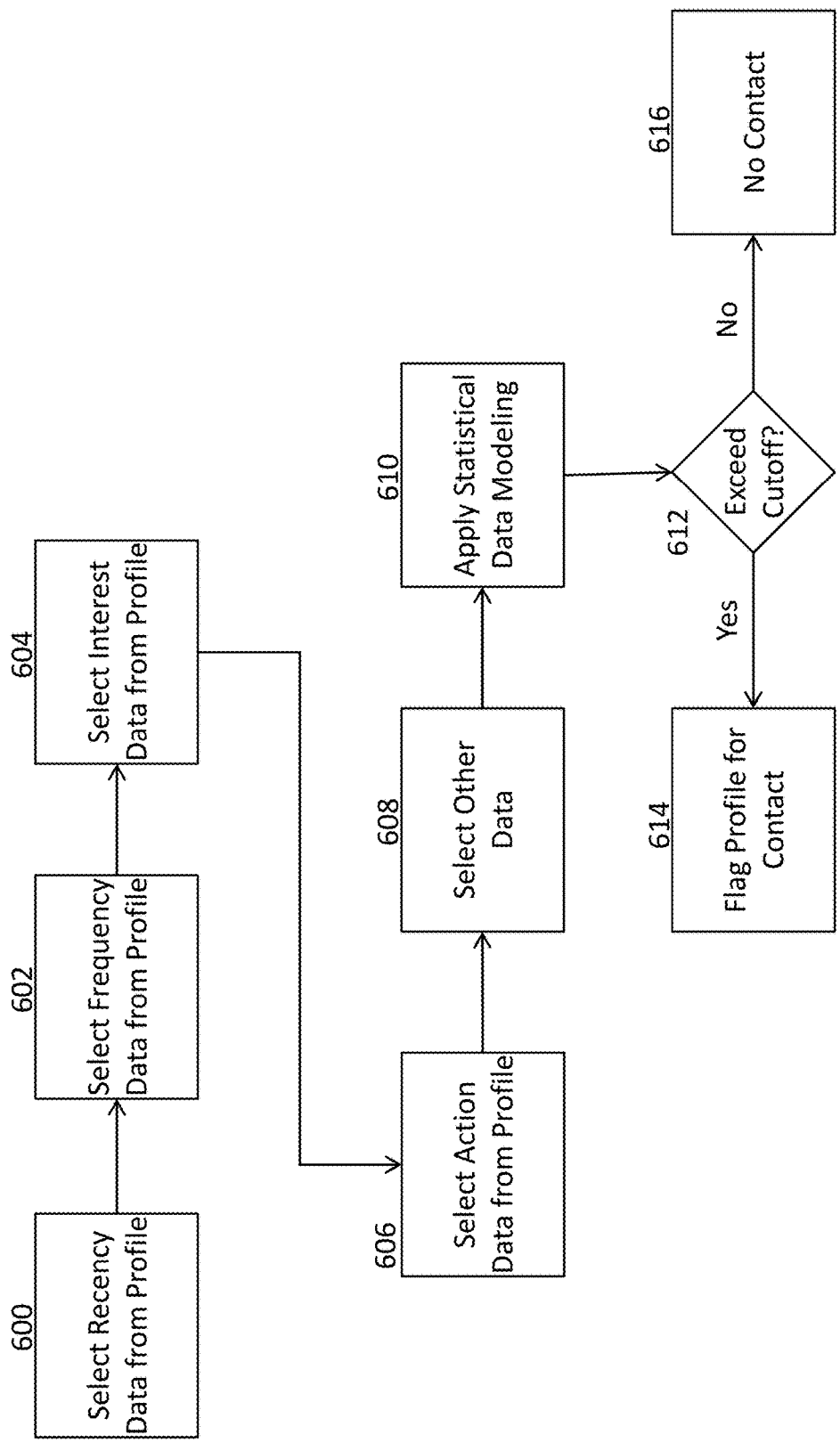
FIG. 6 is a flowchart of a set of steps that a system could perform to apply data modeling and statistical evaluation to customer profile data.

Turning now to FIG. 6, that figure shows a flowchart of a set of steps that a system could perform to apply data modeling and statistical evaluation (108) to newly created or updated customer profile data. While FIG. 6 shows one set of steps for creating a score indicating a profile's engagement with a retailer from one or more pieces of profile data, it should be understood that variations exist that include using different sets of profile data, weighing and valuing data differently, and applying different forms of statistical data modeling to data. In the shown set of steps, the evaluation server (806) may select one or more types of data from the profile to provide data points for a statistical modeling process. The evaluation server (806) may select (600) a set of recency data from the profile that might include information such as date of most recent visit, time since last visit, time since last purchase, time since last cart created, or other data that may provide an indication of how recently a profile has been engaged with various aspects of the retailer. Recency data may be interpreted by the statistical modeling process in a number of ways, for example, a profile that has not visited within 12 months may be less likely to respond to a direct mail marketing campaign. The evaluation server (806) may also select (602) a set of frequency data from the profile that might include information such as number of total visits, number of visits per month over the last year, number of visits originating from banner advertisements, search engines, and direct URL entry, and other information indicating the frequency of the profile's engagement with the site. Frequency data may be interpreted by the statistical modeling process in different ways, for example, a user who frequently visits the retailer site may be considered a less viable target for marketing than a user who visits mainly before large holidays or sales.

The evaluation server (806) may also select (604) a set of interest data from the profile that might include information such as particular products, pages, or features that are used or visited, reviews, videos or product specifications for particular products that have been viewed, and how many times a particular product or feature has been viewed or used, or other information that may indicate the level of interest from a profile in particular products, services, or features of the retailer. Interest may be used by the statistical modeling process to provide strong evidence of engagement, for example, in situations where the data indicates that a profile is returning to the retailer regularly to view a particular item that they likely desire but have yet to purchase. The evaluation server (806) may also select (606) a set of action data from the profile that might include information such as products added to a cart, carts created, special offers accepted, accounts created, sales participated in, redemption of coupons, gift cards, or discount codes, and other information which may indicate that a profile's engagement of the site has passed beyond mere interest or browsing. Action data may be used by the statistical modeling process as being highly indicative of a profile's engagement with a retailer, as adding products to a cart may mean that a profile is all but committed to a purchase and is just waiting for the right moment to complete a transaction. Other data may also be selected (608) from the profile, and may include other data considered by the statistical modeling process to be relevant to measuring profile engagement with a retailer, which could include browser type, device type, referrer type, geotargeted location, browser language type, and other types of information.

With a desired data set selected from a profile, the evaluation server (806) applies (610) one or more statistical data modeling processes in order to determine a score that represents a profile's level of engagement with a retailer, which may be an indicator of the effectiveness of various types of marketing efforts targeted at that profile. An example of data modeling that could be applied is to associate a weighted value with each piece of data selected from the profile, for example, where averaging one visit to the retailer per month over the last 12 months might have a score of 5, viewing a product five or more times might have a score of 10, creating a cart and adding items might have a score of 15, reading reviews for a product might have a score of 10, and so on. Data could be weighted and valued in such a system so that a profile could have a score for an online retailer, with a higher score indicating a higher engagement or interest in the retailer, and a higher likelihood of responding to marketing efforts such as email, targeted ad delivery, or print advertisements.

Figure 10:
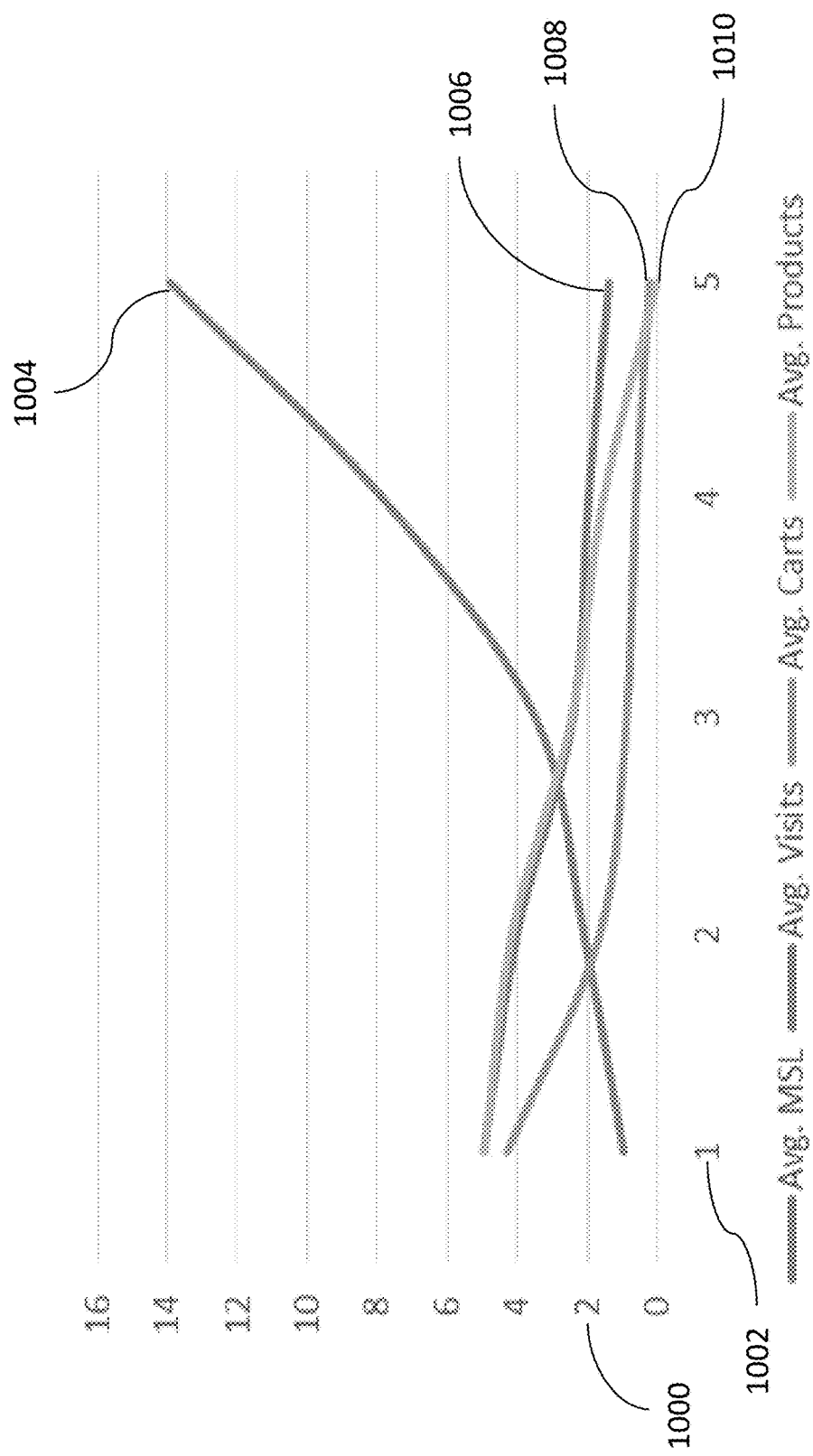
FIG. 10 shows a visual representation of an engagement scoring model using a multi variate regression model.

Another example of a data modeling process that may be applied (610) is to use multi-variate regression. An example data such as could be used as input to such a multi-variate regression process is shown in FIG. 10, which provides a graph whose x-axis (1002) represents a quintile of the population of all profiles such that between 0 and 1 a profile is in the top 20% for likelihood to have a positive response to mail marketing, and whose y-axis (1000) representing an average value for all profiles within a quintile, such that a y-value of 2 within the 0 to 1 quintile of the x-axis means that profiles within that quintile have an average value of 2 for a particular variable. The four graphed variables include average months since last visit (1004), average number of total visits (1006), average number of carts created (1008), and average number of products viewed (1010). As shown in the graph, a lower number of months since last visit (1004) places a profile in a higher quintile for response to mail marketing, while higher numbers of visits (1006), carts (1008), and products (1010) also place a profile in a higher quintile.

Using data such as that reflected in the graph of FIG. 10, multi-variate regression could be used to determine an equation for determining an engagement score (i.e., the likelihood that that individual would respond positively to mail marketing) for any particular individual based on that individual's data. Such an engagement score equation could be, for example $$\text{Engagement Score} = 0.06637 + \text{Visits} * 0.008072183 - \text{MonthsSinceLast} * 0.012257277 + \text{ProductsVisited} * 0.005372264 + \text{Carts} * 0.009777557$$

Of course, it should be understood, even with a particular modeling technique such as multi-variate regression, there are a variety of ways that such a technique could potentially be applied. For example, the equation applied (610) to determine the engagement score could be a globally configured equation, could be specific to each content server (804), specific to geographic regions in which the customer originates from, could be device or browser specific, or could vary based upon other factors. The equation or equations configured for various circumstances could be manually configured by a statistician based upon a study of profile data, or could be automatically generated by the evaluation server (806) based upon an automated analysis of profile data.

Such a multi-variate regression equation could be updated over time based upon the results and feedback from marketing efforts previously utilizing the linear regression model, so that as more profiles become available to the evaluation server (806) and more result data becomes available the model becomes more beneficial in predicting marketing outcomes. Regardless of the type of data modeling used (610) to determine a value representative of profile engagement, the evaluation server (806) may determine whether the value exceeds (612) a minimum level of profile engagement. If the minimum level of profile engagement is exceeded (612), the profile may be flagged (614) for one or more types of marketing contact. If the minimum level of profile engagement is not met or exceeded (612), no further action will be taken (616) towards contacting the profile, at least until further visits are associated with the profile and an engagement score can be recalculated.

The minimum level of profile engagement may be a global threshold, a content server (804) specific threshold, a geographically specific threshold, or another configured threshold. For example, a globally applied minimum level of profile engagement may filter out profiles which the evaluation server (806) can determine have no substantial possibility of a return on investment regardless of the type of marketing used. This could be, for example, the bottom 80% of all user profiles based on engagement score, or the bottom 60% of all user profiles based on engagement score, or another threshold based on the available data. This threshold would be intended to filter out user profiles that exhibit such a low engagement score that not even the low cost of an email marketing campaign would offer a return on investment. A content server (804) specific threshold might be appropriate where a particular client might request an increase in marketing efforts at less engaged potential customers, perhaps because they have recently been positively identified in news or social media, or have a particularly appealing sale or event occurring, or due to other factors that might not be reflected in the statistical analysis performed. This might result in a minimum engagement threshold that would allow the top 30-50% of all profiles to be flagged for contact. Or, in the opposite scenario, a particular client might request a more conservative marketing approach for any of a variety of reasons. This might result in a minimum engagement threshold that would allow only the top 10-15% of all profiles to be flagged for contact.

Figure 7:
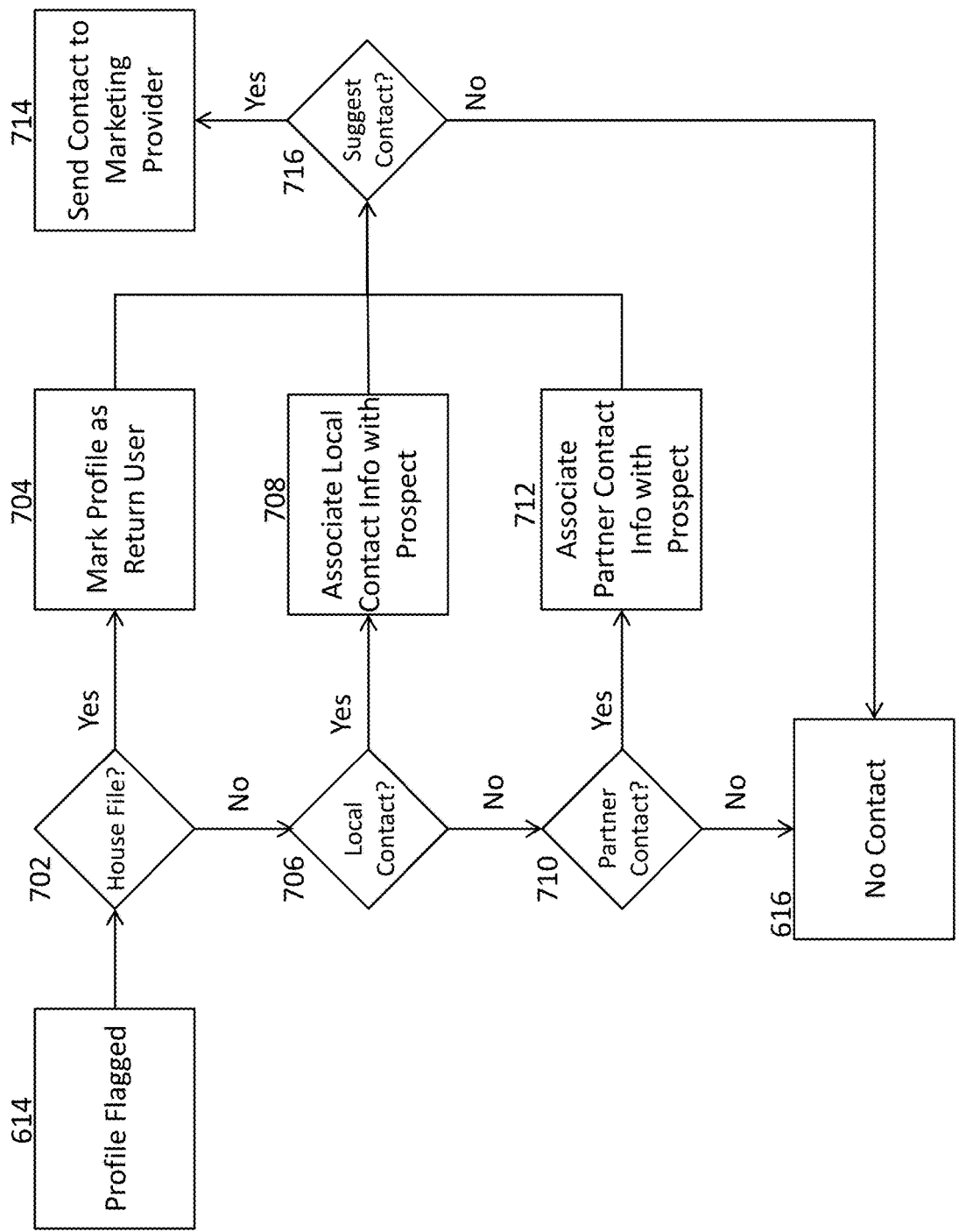
FIG. 7 is a flowchart of a set of steps that a system could perform to provide a requester with contact data for customers that have been identified as likely purchasers based upon data modeling and statistical evaluation.

Turning now to FIG. 7, that figure shows a flowchart of a set of steps that a system could perform to prepare contact data for customers that have been identified as likely purchasers based upon data modeling and statistical evaluation so that it can be provided to a marketing provider (814), or an engagement score requester (812), or both. As profiles are flagged (614) for contact, the evaluation server (806) may use information from the profile to determine what types of contact information are available (702) via a house file for the online retailer. For example, if a profile contains a profile ID number, this may be used to search a house file on the content server (804) for matching records, which may contain an email address, phone number, or mailing address. Similarly, if the profile already contains an email address, the email address may be used to search a house file on the content server (804) for matching records in order to identify a phone number or mailing address. If one or more pieces of contact information are located (702) in the house file, the profile may be marked (704) as a returning user and associated with the house file contact information.

If the house file does not have any contact information for the profile, or if it cannot provide all desired forms of contact for the profile, the evaluation server (806) may search to determine (706) if there is any local contact information for the profile. This may be information available to the evaluation server (806) itself via a connected database, and could include contact information that has been gathered for profiles based upon their interactions with other retailers. For example, if contact information is identified for a profile as a result of a first retailer requesting contact information for that profile, that contact information may be stored locally by the evaluation server (806). Then, if a second retailer also requests contact information for that profile based upon a subsequent engagements core calculation for that second retailer, the contact information may be available locally (706) on the evaluation sever (806) or a connected database. If contact information is available locally, the profile may be marked as a prospect and may be associated with the locally available contact information.

If contact information is not available in the house file (702) or local to the evaluation server (706), or if each desired contact information is not available via the same, the system may query a contact partner network (810) to determine (710) if any contact information is available for the profile from an external source. If contact information is available from the contact partner (710), the contact information may be associated (712) with the profile and the profile may be marked as a prospect. If no contact information is available after querying a contact partner network (810), the profile may be marked as lacking contact information, and further contact efforts for the profile may be avoided (616) until the profile is updated or more information becomes available via a house file, local records, or contact partner records.

In cases where contact information is available, the evaluation server (806) may determine (716), based upon the forms of contact information available and the engagement score, whether or not to send (714) the contact information to a marketing provider (814). This determination could be based upon an estimated cost of the contact, such as postal cost or promotional credit costs, whether the particular type of contact is possible, such as where a particular engagement score requester (812) might only allow mail marketing, or might be based upon a dynamic cost of marketing that might change daily or hourly, with multiple marketing providers (814) bidding on potential work, such as occurs with real-time bidding and banner advertisement delivery.

Information sent (714) might include the available contact information, as well as an indication of the type of marketing contact that should be made, advertisement images, graphics, or other promotional materials that should be included, or similar information that a marketing provider (814) might need. Providing information to the marketing provider (814) instead of to a party associated with the content server (804) allows the evaluation server (806) to serve as a buffer between the identity and contact information of the user device (800) and the marketing efforts of persons associated with the content server (804).

Information may be sent (714) to the marketing provider (814) in a variety of ways, for example, via email, via a software application, or made available via a web interface or other software interface. Information may be sent (714) in an ongoing basis as profiles are created and updated as part of a subscription service where profiles might be scored for an engagement score requester (812) hourly, daily, or weekly in order to identify the top quintile of profiles based upon engagement score for that retailer at that time. Information could also be sent (714) to a marketing provider (814) on demand, in response to a request from an engagement score requester for an immediate campaign targeting the top quintile of profiles based upon engagement score for that retailer. Information sent (714) may include an indication for one or more types of contact, such as contact by printed advertisement, contact by phone or text message, contact by email, and other forms of contact, and may also include graphics, text, links, or other promotional materials or information that should be included with each type of contact.

Figure 9:
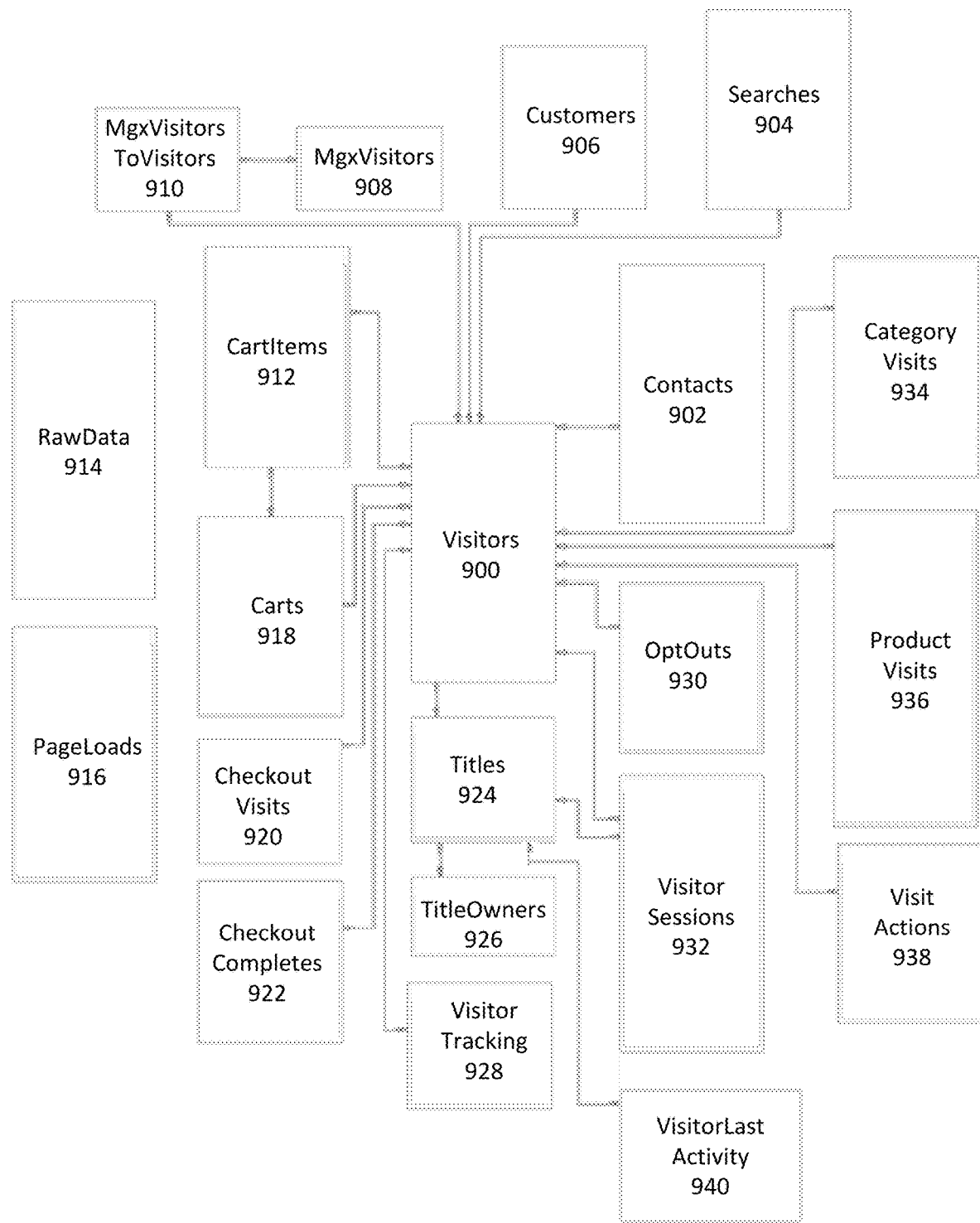
FIG. 9 shows an example of a data schema that could be used to store and relate one or more data fields used by the system.

FIG. 9 shows an example of a data schema that might be used to store data fields relating to one or more of the steps described above. While the schema shown in FIG. 9 may be described in terms of a relational database, it should be understood that many types of databases will support the organizational requirements of the disclosed technology. Table 1 below provides additional information on each table shown in FIG. 9 and examples of fields that could be stored therein.

TABLE 1

Exemplary Data Tables and Data Fields

| Table Name | Fields |
|---|---|
| Visitors (900) | Id, TitleId, PageLoadId, Keycode, Uid, Eid, Sid, Utm, Url, Referrer, Navigator, Datestamp, DateCreated, UF, UtmSource, UtmMedium, UtmCampaign |
| Contacts (902) | Id, VisitorId, EmailAddress, MobilePhone, CatelogRequest, InputForm, Keycode, List, Zipcode, Uid, PageLoadId, DateStamp, DateCreated, UF |
| Searches (904) | Id, VisitorId, TitleId, SearchPhrase, ItemCount, ItemsShown, Url, Uid, PageLoadId, DateStamp, DateCreated, Uf |
| Customers (906) | Id, VisitorId, TitleId, CustomerNumber, Zipcode, Keycode, PageLoadId, DateStamp, DateCreated, UF |
| MgxVisitors (908) | Id, TitleId, DateStamp, UF |
| MgxVisitorsToVisitors (910) | Id, MgxVisitorId, TitleId, VisitorId, DateStamp |
| CartItems (912) | Id, VisitorId, TitleId, CartId, Sku, ProductName, Quantity, UnitPrice, ImagePath, PageLoadId, DateStamp, DateCreated, UF, Details, ProductId, Attributes |
| RawData (914) | Id, VisitorId, MgxVisitorId, AccessKey, Method, RawData, Url, Version, PageLoadId, Sequence, RemoteAddr, Processed, BatchId, DateStamp |
| PageLoads (916) | Id, VisitorId, TitleId, Keycode, Method, Uid, Eid, Sid, Utm, Url, Referrer, Navigator, DateStamp, DateCreated, UF, UtmSource, UtmMedium, UtmCampaign |
| Carts (918) | Id, VisitorId, TitleId, ExtCardId, OrderId, Archive, Keycode, Uid, PageLoadId, DateStamp, DateCreated, UF |
| CheckoutVisits (920) | Id, VisitorId, TitleId, CartId, ShippingCost, PageLoadId, DateStamp, DateCreated, UF |
| CheckoutCompletes (922) | Id, VisitorId, TitleId, CartId, OrderId, OrderTotal, PageLoadId, DateStamp, DateCreated, UF |
| Titles (924) | Id, TitleOwnerId, Name, Url, AccessKey, LookupKey, Workspace, DateStamp, Machine, UseWorkspace, Active, Staging, Ver |
| TitlesOwners (926) | Id, CompanyName, DateStamp |
| VisitorTracking (928) | Id, VisitorId, TitleId, Type, Value, PageLoadId, DateStamp |
| OptOuts (930) | Id, VisitorId, TitleId, EmailAddress, MobilePhone, Keycode, List, Uid, PageLoadId, DateStamp, DateCreated, UF |
| VisitorSessions (932) | Id, VisitorId, TitleId, PageLoadId, Keycode, Uid, Eid, Sid, Utm, Url, Referrer, Navigator, DateStamp, DateCreated, UF, RemoteAddr, UtmSource, UtmMedium, UtmCampaign |
| CategoryVisits (934) | Id, VisitorId, TitleId, CategoryId, CategoryName, ImagePath, ItemsShown, Url, Uid, PageLoadId, DateStamp, DateCreated, UF, ContentType |
| ProductVisits (936) | Id, VisitorId, TitleId, Sku, ProductName, ImagePath, StockStatus, Url, CrossSells, ReviewStars, ReviewCount, AltImageCount, HasVideo, Uid, PageLoadId, DateStamp, DateCreated, UF, Canonical, StandardPrice, SpecialPrice, Keycode, ContentType |
| VisitActions (938) | Id, VisitorId, TitleId, PageLoadId, VisitType, VisitKey, ActionType, ActionKey, DateStamp |
| VisitorLastActivity (940) | VisitorId, TitleId, PageLoadId, Method, Url, Category, Product, Search, Cart, Contact, OptOut, Customer, CheckoutVisit, CheckoutComplete, CategoryDate, ProductDate, SearchDate, CartDate, ContactDate, OptOutDate, CustomerDate, CheckoutVisitDate, CheckoutCompleteDate, Product1, Product2, Product3, Product4, Category1, Category2, Category3, Category4, EmailAddress, DateStamp, DateCreated, UF, Uid, RemoteAddr |

As can be seen from FIG. 9 and Table 1, the stored data, particularly the data stored in table VisitorLastActivity (940) may be used to wholly or partially populate the fields of a user profile before scoring. See Table 2 below, which shows an exemplary user profile object fields, to further illustrate this relation.

TABLE 2

Exemplary user profile data fields.

| Profile Field | Field Description |
|---|---|
| Profile ID | Email address, partner IDKey, or VisitorID |
| Visits | Total number of website visits |
| MSL | Months Since Last Visit |
| 3MV | Visits in last three months |
| 6MV | Visits in last six months |
| 12MV | Visits in last twelve months |
| 24MV | Visits in last 24 months |
| 25MV | Visits more than 24 months ago |
| Email | Visits where email was source |
| CPC | Visits where pay per click advertising was the source |
| Organic | Visits where natural search was the source |
| Referral | Visits where referral was the source |
| Direct | Visits where a direct load of the site was the source |
| Mobile | Visits using a small screen mobile device |
| Tablet | Visits using a tablet device |
| Desktop | Visits using a desktop device |
| PageType_12 | Visits in last 12 months to a page type (e.g. an article page type) |
| PageType | Total number of visits to a page type |
| OpenCart | Number of open carts |
| Orders | Number of Orders |
| Cat1 | Total number of visits to a specified page type (e.g. product page 1) |

TABLE 2-continued

Exemplary user profile data fields.

| Profile Field | Field Description |
| --- | --- |
| Cat2 | Total number of visits to a specified page type (e.g. product page 2) |
| Cat3 | Total number of visits to a specified page type (e.g. product page 3) |
| Cat4 | Total number of visits to a specified page type (e.g. product page 4) |
| Cat5 | Total number of visits to a specified page type (e.g. product page 5) |
| Cat6 | Total number of visits to a specified page type (e.g. product page 6) |
| Cat7 | Total number of visits to a specified page type (e.g. product page 7) |
| Cat8 | Total number of visits to a specified page type (e.g. product page 8) |
| Cat9 | Total number of visits to a specified page type (e.g. product page 9) |
| Cat10 | Total number of visits to a specified page type (e.g. product page 10) |
| Thrudate | Most recent date of date range allowed for inclusion of profiles |
| Segment | Segment group assigned to profile based on scoring process |
| Device | Alpha/text |
| Device_code | Numeric code denoting device |
| Source | Referring source of profile for majority of visits to site (e.g. email, paid advertisement) |
| Source_code | Numeric code denoting source |
| ID1 Prod1 | ID on last specified page visited |
| ID1 Prod2 | ID on second to last specified page visited |
| ID1 Prod3 | ID on third to last specified page visited |
| ID1 Prod4 | ID on fourth to last specified page visited |
| ID1 Cat1 | ID on last specified page visited |
| ID1 Cat2 | ID on second to last specified page visited |
| ID1 Cat3 | ID on third to last specified page visited |
| ID1 Cat4 | ID on fourth to last specified page visited |

Figure 11:
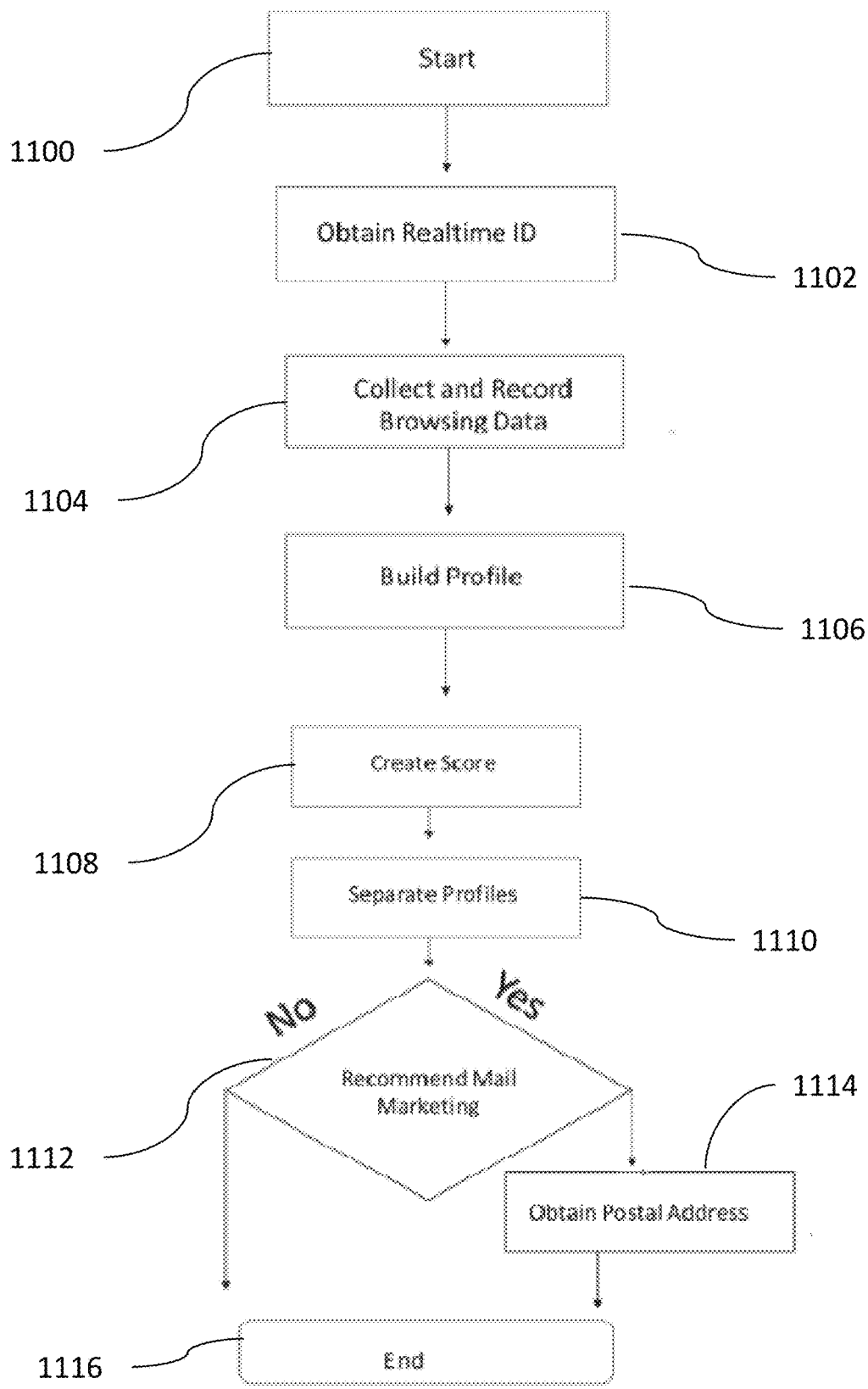
FIG. 11 shows an alternate representation of a set of a high level steps that a system could perform to evaluate a potential customer based upon a statistical analysis of their activities.

FIG. 11 provides further illustration of the technology disclosed herein and how it may be used to determine and act upon an engagement score based upon interaction data gathered from a user device (800). It should be noted that, while the diagram of FIG. 11 uses some terminology which is somewhat different than that used in describing prior figures (e.g. "Realtime ID" instead of "user identifier" or "browsing data" instead of "interaction data"), the difference in terminology does not and should not be treated as implying a divergence in the concepts underlying the previous figures from the concepts underlying FIG. 11. The process of FIG. 11 starts (1100) when a visitor first visits a web page implementing the technology disclosed herein. An attempt is made to identify (1102) the user by obtaining a Realtime ID, partner ID, or other unique or semi-unique identifier. This could include examining the URL for identifying parameters, or examining data stores, caches, or cookies present on the user device (800). After identifying (1102) the user, or creating a new identity for the user, browsing data is collected (1104) and stored, including the time of visit, referring URL, parameters parsed from URL, remote address, navigator, type of page visited, descriptive elements about the page visited (e.g. product id, product name, article id, article name, category id, category name, image path, image id, reviews, inventory status, cart id, cart items, pricing, checkout id, confirmation page id, any email address entered or provided, and other similar data. Such data may be stored in a database schema such as that shown in FIG. 9.

A profile may then be built (1106) or identified from previously existing profiles. The profile contains a subset of all of the data that is associated with the same identity that may be indicative of that identity's engagement with the website. This profile is used to create (1108) a score indicating the likelihood of the identity to respond to a mail marketing campaign. One way of determining the score may be to apply the profiles for shoppers who were previously a part of a mail marketing campaign, appending the number of dollars actually ordered from this previous campaign, and using linear regression to determine which profile elements are predictive and their weights. As previously disclosed, this could also rely on a multi-variate regression equation or other statistical data modeling. These profiles may then be grouped into quintiles based on their determined score. Profiles for known customers of the website may be separated (1110) from the remainder, with the known customers being classified as returning customers and the remainder of profiles being classified as prospective customers. A decision is then made (1112) about recommending whether to engage in mail marketing for a profile. Returning customer profiles are provided to the client with their engagement score and profile data, with a recommendation that they be mailed advertisements. Records from the top one or two quintiles of prospective customers are flagged for contact.

For profiles of prospective customers that are recommended (1112) for advertising, postal addresses may be obtained (1114). This may include querying partner networks in an order based upon their past success in returning correct postal information as well as the cost of such information, and may include matching email address to postal address, matching Realtime partner ID's or other unique identifiers to postal address, or matching IP address and datestamp to postal address. Such information may then be passed to a marketing provider (814) to complete the mailing to prospective customer profiles.

In light of the potential for variations and modifications to the material described explicitly herein, the disclosure of this document should not be treated as implying limits on the protection provided by this document or any related document. Instead, the protection provided by a document which claims the benefit of or is otherwise related to this document should be understood as being defined by its claims, when the terms in those claims which are explicitly defined under the "Explicit Definitions" heading are given their explicit definitions, and when all other terms are given their broadest reasonable interpretation as shown by a general purpose dictionary. To the extent that the interpretation which would be given to the claims based on the above disclosure is in any way narrower than the interpretation which would be given based on the explicit definitions under the "Explicit Definitions" heading and the broadest reasonable interpretation as provided by a general purpose dictionary, the interpretation provided by the explicit definitions under the "Explicit Definitions" heading and broadest reasonable interpretation as provided by a general purpose dictionary shall control, and the inconsistent usage of terms in the specification shall have no effect.

Explicit Definitions

When used in the claims, "based on" should be understood to mean that something is determined at least in part by the thing that it is indicated as being "based on." When a claim is written to require something to be completely determined by a thing, it will be described as being "based EXCLUSIVELY on" the thing.

When used in the claims, a "channel" should be understood to refer to a medium through which information may be transmitted from an origin to a destination. Information transmitted may be in a form such as a solid, a pulse of electromagnetic radiation, an electrical signal, or other tangible or intangible forms.

When used in the claims, a "computer" should be understood to refer to a group of devices (e.g., a device comprising a processor and a memory) capable of storing and executing instructions for performing one or more logical and/or physical operations on data to produce a result. A "computer" may include, for example, a single-core or multi-core microcontroller or microcomputer, a desktop, laptop or tablet computer, a smartphone, a server, or groups of the foregoing devices (e.g., a cluster of servers which are used in combination to perform operations on data for purposes such as redundancy and availability). In the claims, the word "server" should be understood as being a synonym for "computer," and the use of different words should be understood as intended to improve the readability of the claims, and not to imply that a "sever" is not a computer. Similarly, the various adjectives preceding the words "server" and "computer" in the claims are intended to improve readability, and should not be treated as limitations.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Examples of computer readable mediums including the following, each of which is an example of a non-transitory computer readable medium: volatile memory within a computer (e.g., RAM), registers, non-volatile memory within a computer (e.g., a hard disk), distributable media (e.g., CD-ROMs, thumb drives), and distributed memory (e.g., RAID arrays).

When used in the claims, to "configure" a computer should be understood to refer to providing the computer with specific data (which may include instructions) and/or making physical changes in the computer (e.g., adding peripherals) which can be used in performing the specific acts the computer is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

When used in the claims, "first," "second" and other modifiers which precede nouns or noun phrases should be understood as being labels which are intended to improve the readability of the claims, and should not be treated as limitations. For example, references to a "first communication server" and a "second communication server" should not be understood as requiring that one of the recited servers precedes the other in time, priority, network location, or any other manner.

When used in the claims, a "non-transactional communication session" should be understood to mean a period of time in which a user device provides one or more requests for content to a content server, and a content server provides one or more content responses to a user device in response, where no single request for content includes a request to complete a financial transaction between the user device and the content server, and where no single content response contains an indication that a financial transaction was completed between the user device and the content server.

When used in the claims, "provide" should be understood to mean causing the thing to which something is provided to have that thing, either directly or indirectly. For example, a server could "provide" a set of instructions to a remote computing device by sending the set of instructions directly to the remote computing device, and could also "provide" the set of instructions to the remote computing device by sending the remote computing device data which would cause the remote computing device to send a message to an external system which would respond to the message by sending the set of instructions to the remote computing device.

When used in the claims, a "set" should be understood to refer to a group of one or more things of similar nature, design or function. The words "superset" and "subset" should be understood as being synonyms of "set," and the use of different words should be understood as intended to improve the readability of the claims, and not imply differences in meaning.

What is claimed is:

1. A system comprising:
i) an evaluation server in communication with a database;
ii) a user device having a display;
iii) a content server configured to communicate with the user device during a non-transactional communication session;
wherein:
a) the content server is configured to provide a set of response data to the user device in response to a request for content from the user device, the set of response data comprising a set of content and a set of data collection instructions;
b) the set of response data is adapted to cause the user device to display the set of content and execute the set of data collection instructions;
c) the set of data collection instructions is adapted to cause the user device to provide a user identifier and a set of interaction data to the evaluation server during the non-transactional communication session;
d) the evaluation server is configured to execute instructions to:
I) receive the user identifier and the set of interaction data and:
A) select a user profile based upon one or more of the user identifier and the set of interaction data if the user profile is already in the database; or
B) create the user profile where the user profile is not in the database;
II) add a subset of the interaction data to the user profile;
III) perform a statistical evaluation on the user profile that creates a response score, and associate that response score with the user profile; and
IV) if the response score satisfies a set of contact criteria, determine a set of contact information based upon the user profile and provide a subsequent communication over a second channel to a recipient based upon the set of contact information, wherein determining the set of contact information based upon the user profile and providing the subsequent communication over the second channel to the recipient based on the set of contact information comprises, when contact information for the recipient is not available in a house file of a provider of products or services corresponding to the content comprised by the set of response data, is not available in the user profile, and is available through an external partner, instructing a separate marketing provider to send the subsequent communication to the recipient using the contact information from the external partner.

2. The system of claim 1, wherein:
   a) the set of content comprises a set of Hyper Text Markup Language instructions;
   b) the set of data collection instructions comprises a set of JavaScript instructions; and
   c) the user profile comprises a duration of time since the user device's last non-transactional communication session, and a number of total non-transactional communication sessions for the user device.

3. The system of claim 1, wherein the set of data collection instructions are adapted to cause the user device to:
   a) search a local data storage for the user identifier;
   b) where the user identifier does not exist, create the user identifier in the local data storage; and
   c) provide the user identifier to the evaluation server.

4. The system of claim 1, wherein the instructions to select the user profile further comprise instructions that when executed cause the evaluation server to, where the user profile does not exist:
   a) provide a request for the user profile having one or more attributes matching the user identifier to an identity data repository, the request for the user profile comprising the user identifier;
   b) create the user profile in the database only when a response from the identity data repository indicates that the user profile does not exist in an identity data repository database.

5. The system of claim 1, wherein the instructions to perform a statistical evaluation on the user profile that creates the response score comprise instructions that when executed cause the evaluation server to:
   a) select a subset of a plurality of profiles, wherein the user profile is one of the plurality of profiles; and
   b) determine an output of a multi-variate regression equation based upon at least one value of each item of the subset of a plurality of profiles;
   wherein the output of the multi-variate regression equation indicates the user profile's probability of responding to the subsequent communication over the second channel.

6. The system of claim 5, wherein the multi-variate regression equation requires as input:
   a) an elapsed time since a previous non-transactional communication session; and
   b) a total number of previous non-transactional communication sessions.

7. The system of claim 5, wherein the set of contact criteria comprise a requirement that the response score for the user profile be within the top quintile of a set of historic response scores determined by the evaluation server, and wherein:
   a) the first channel is a computer network; and
   b) the second channel is a network for transporting physical documents.

8. The system of claim 1, wherein the set of data collection instructions comprise a static instruction, wherein the static instruction is adapted to, when executed by the user device, cause the user device to request a set of dynamic instructions from the evaluation server, wherein the set of dynamic instructions are adapted to be executed by the user device after receipt and cause the user device to provide the user identifier and the set of interaction data to the evaluation server.

9. The system of claim 8, wherein the set of dynamic instructions comprises a site definition, wherein the site definition maps at least one content variable to at least one evaluation server variable, and wherein the evaluation server is configured to create the site definition by executing a set of instructions to cause the evaluation server to perform a site analysis.

10. The system of claim 9, wherein the set of instructions that when executed cause the evaluation server to perform the site analysis comprise instructions to:
    a) request a set of test content from the content server;
    b) use a set of regular expressions, wherein each regular expression of the set of regular expressions is associated with an evaluation server variable of a plurality of evaluation server variables, to identify a content variable within the set of test content based upon one or more of:
       i) a variable name located proximate to the content variable;
       ii) a naming convention associated with a plurality of content variables and used by the content variable;
       iii) an input type of an input element associated with the content variable; and
       iv) a set of input validation instructions associated with the input element associated with the content variable;
    c) create a variable map between the content variable and the evaluation server variable based upon a matching regular expression of the set of regular expressions that was used to identify the content variable.

11. The system of claim 10, wherein the evaluation server is further configured to update the site definition based upon the variable map between the content variable and the evaluation server variable.

12. A method comprising the steps:
    a) providing a set of data collection instructions adapted to cause a user device to transmit a user identifier and a set of interaction data to an evaluation server over a first channel during a non-transactional communication session between the user device and a content server;
    b) during the non-transactional communication session at the evaluation server, receiving the user identifier and the set of interaction data and:
       i) selecting a user profile based upon one or more of the user identifier and the set of interaction data where the user profile already exists; or
       ii) creating the user profile where it does not exist;
    c) adding a subset of the interaction data to the user profile;
    d) performing a statistical evaluation on the user profile that creates a response score and associating the response score with the user profile; and
    e) where the response score satisfies a set of contact criteria, determining a set of contact information based upon the user profile and providing a subsequent communication over a second channel to a recipient based upon the set of contact information, wherein determining the set of contact information based upon the user profile and providing the subsequent communication over the second channel to the recipient based on the set of contact information comprises, when contact information for the recipient is not available in a house file of a provider of products or services, is not available in the user profile, and is available through an external partner, instructing a separate marketing provider to send the subsequent communication to the recipient using the contact information from the external partner.

13. The method of claim 12, wherein the set of data collection instructions are adapted to cause the evaluation server to receive the user identifier from a local storage of the user device, wherein the user identifier is either:
 a) created during a current non-transactional communication session; or
 b) present in the local storage of the user device prior to the current non-transactional communication session.

14. The method of claim 12, wherein performing the statistical evaluation on the user profile comprises the steps:
 a) selecting a subset of a plurality of user profiles, wherein the user profile is one of the plurality of profiles; and
 b) determining an output of a multi-variate regression equation based upon at least one value of each item of the subset of a plurality of user profiles;
 wherein the output of the multi-variate regression equation indicates the user profile's probability of responding to the subsequent communication over the second channel.

15. The method of claim 12, wherein:
 a) the method comprises, prior to the non-transactional communication session, providing a content server a static instruction adapted to, when executed by the user device, cause the user device to request a set of dynamic instructions from the evaluation server;
 b) providing the set of data collection instructions comprises the providing the set of dynamic instructions to the user device in response to receiving a request for the set of dynamic instructions;
 wherein the set of dynamic instructions is at least partially unique to the content server.

16. The method of claim 12, wherein the set of contact criteria comprise a requirement that the response score for the user profile be within the top quintile of a set of historic response scores determined by the evaluation server; and wherein:
 a) the first channel is a computer network; and
 b) and the second channel is a network for transporting physical documents.

17. The method of claim 12, wherein the set of data collection instructions comprises a site definition, wherein the site definition is adapted to map at least one content variable to at least one evaluation server variable, further comprising the step of, at the evaluation sever, creating the site definition by performing a site analysis.

18. The method of claim 17, wherein performing the site analysis comprises the steps:
 a) requesting a set of test content from a content server;
 b) using a set of regular expressions, wherein each regular expression of the set of regular expressions is associated with an evaluation server variable of a plurality of evaluation server variables, to identify a content variable based upon one or more of:
  i) a variable name located proximate to the content variable;
  ii) a naming convention associated with a plurality of content variables and used by the content server variable;
  iii) an input type of an input element associated with the content variable; and
  iv) a set of input validation instructions associated with the input element associated with the content variable;
 c) creating a variable map between the content variable and the evaluation server variable based upon a matching regular expression of the set of regular expressions that was used to identify the content variable.

* * * * *